Nov. 8, 1949  T. J. BROWN  2,487,094
POLE HOLDER DEVICE
Filed May 7, 1948
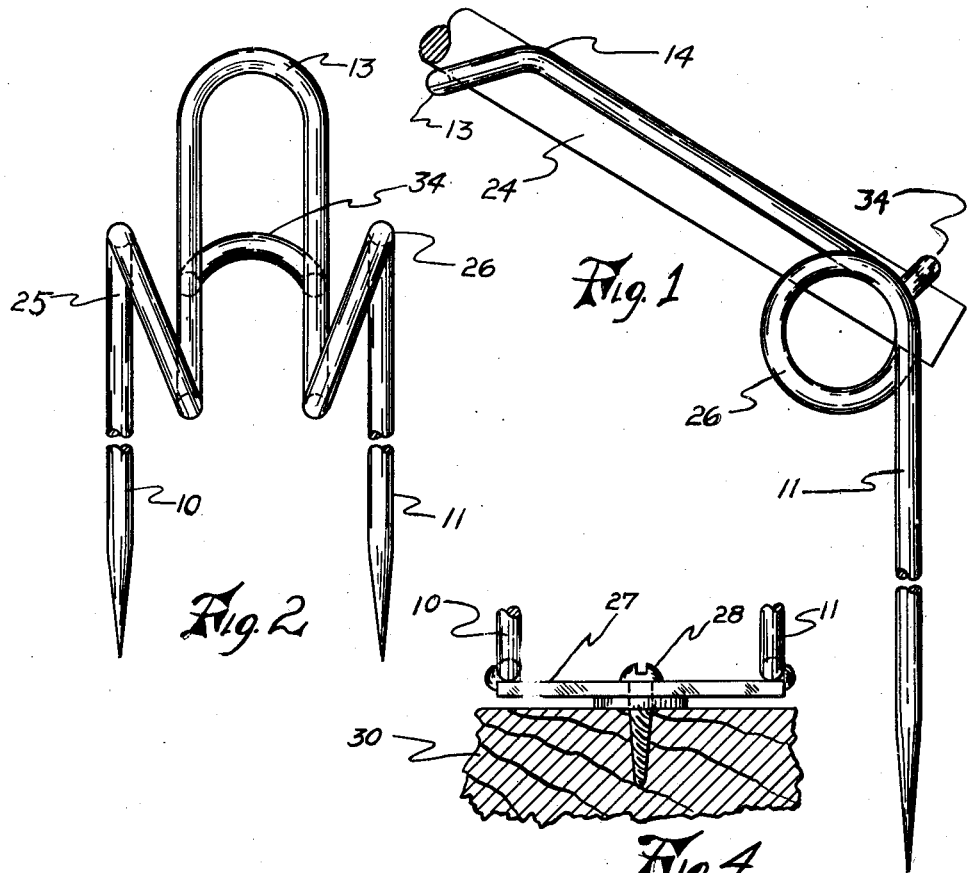
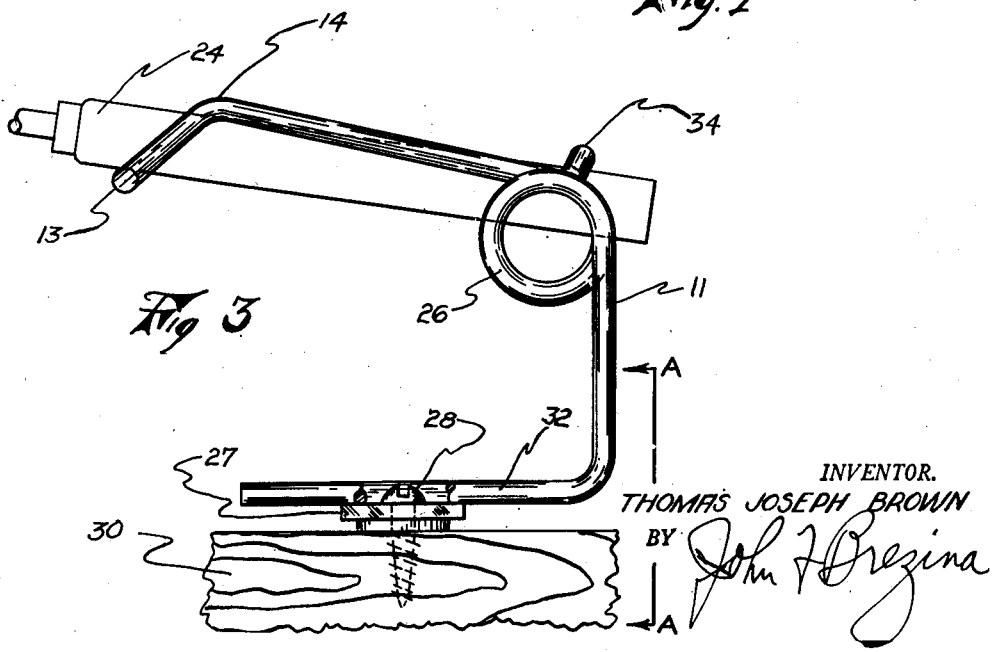
INVENTOR.
THOMAS JOSEPH BROWN
BY John F Brezina Patented Nov. 8, 1949

2,487,094

UNITED STATES PATENT OFFICE 2,487,094

POLE HOLDER DEVICE

Thomas Joseph Brown, Oklahoma City, Okla., assignor to Elijah Bryant Bush, Oklahoma City, Okla.

Application May 7, 1948, Serial No. 25,755

6 Claims. (Cl. 248—42)

This invention is directed to pole and rod supporting devices, and more particularly to improvements for portable holding means and devices adapted for supporting fish poles, fish rods, or flag poles or similar units, adapted either to be removably mounted in the earth or secured to any suitable support, either portable or stationary.

It is an object of my invention to provide a holder or removable holding device for removably holding a pole or rod, and under any one or more of normally encountered conditions.

A further object is to provide an inexpensive holding or mounting device for poles or rods which is adapted to be mounted in the earth or to any object and in any desired position according to the desire or requirements of the case, such as on or into the ground, on a dock, boat or other stationary or movable object.

A further object is to provide a pole holder having flexibility and means adapted to permit downward movement of the pole when an object pulls upon the outer and projecting end of the pole and so as to cause a return or upward movement of the pole when such pull is decreased or wholly or partially released.

Other objects of my invention will be apparent from the following description and the appended claims.

In fishing various conditions are encountered both in fishing from a bank or dock and from a boat. Where fishing is done from a ground bank, one embodiment of my invention is adapted to be pressed into and anchored in the ground so that the holding device extends in an upward direction and at the desired angle to support the pole in projecting position over the water. Where hard surface prevails, the device may be weighted down and held in upwardly extending position by a rock or other object, and in the case of a boat the same may be removably fastened in any suitable manner to the edges or end portion of the boat.

On the drawings:

Fig. 1 is an end view of the device of Fig. 3, though having the legs thereof extended downwardly, tapered and pointed.

Fig. 2 is a side elevation of the embodiment of Fig. 4.

Fig. 3 is a view illustrating my device.

Fig. 4 is a fragmentary broken away view of the pole holder of Figs. 1 and 2 and having the lower ends of the legs bent angularly and secured to a rotatable element.

Referring to the drawings, numeral 13 designates the downwardly bent U-shaped bracket, yoke, or support whose two integral side portions are extended in a generally common direction and each thereof are bent at 14 and thence turned to form intermediate loops and spiral springs 25 and 26. The metal rod or member from which said bracket and springs are formed is continued at an angle greater than a right angle with relation to bracket 13 to form substantially parallel legs or prongs 10 and 11 of substantial length which are optionally beveled and pointed at their lower ends as illustrated in Figs. 1 and 2, to facilitate their insertion into the ground or other supporting surface. Each of said legs or supports 10 and 11 may be bent at a right angle at an intermediate point as illustrated in Fig. 3, to form a normally horizontally extending support 32 which may be either inserted diagonally into the ground or engaged beneath a weighted object placed thereon, or optionally secured by any suitable fastening means upon a bar or like means 27, which bar may be removably mounted on a stationary, rotatable or otherwise movable element 30, and pivotally secured to said element 30 by any suitable means such as a centrally placed pivoting screw 28, which screw 28 is threaded through the bar 27 into the supporting element designated as 30 in Fig. 3. Only a fragment of the supporting element 30 is illustrated in elevation in Fig. 3.

As shown in Figs. 1, 2 and 3, the opposite ends of an arched cross bar or yoke 34 are secured to the inner sections of the spiral springs 26 and 25 by welding or the like so as to provide a retaining yoke or member under which the butt or handle end of the pole 24 may be inserted and wherein the weight of the projected part of the pole or rod will hold the same.

As illustrated in Figs. 3 and 4, the centrally apertured cross bar or member 27 is secured at its opposite ends to the horizontally extending supports 32 of the supporting legs. A screw 28 passes through the central aperture of said cross bar 27 and is threaded into a supporting element 30, (Fig. 3) which may be the deck, dock or side of a boat or may be a stationary or movable support. By mounting the screw 28 loosely the pole holder will be rotatably mounted to turn about the screw 28 so that the pole may swing with the wind and maintain itself pointed in the direction of the wind. Said device may also be conveniently attached by staples, eyelets or equivalent fastening elements to either vertical, horizontal or inclined supports.

The spiral springs 25 and 26, which are integral with the bracket 13 are preferably made of metal and of such thickness and texture that slight pulls or jerks on the object connected to the projected end of the pole or rod will move and spring the bracket downward and a rocking movement will be imparted to the pole or rod which is easily noticed from even a substantial distance.

In the embodiment illustrated in the drawings, these depending supporting legs 10 and 11 themselves are made of relatively thin metal bars or rods and they will have a certain flexibility in addition to that of the coil or spiral springs, so that when said legs are either inserted into the ground or otherwise secured to the supporting element or stationary surface, the portions of said legs above the supporting means will bend to a limited degree when pulls are imparted to the pole or the like mounted in said device.

The coil springs 25 and 26 are formed spirally as before stated so that the adjacent arcuate sections thereof are spaced apart in order to avoid any friction between the lateral surfaces of such adjacent spring sections and to thereby give greater flexibility without one part of the spring rubbing another part.

In the use of the rod or pole support for fishing, my invention may be quickly and easily mounted in the desired position and location upon or in any normally encountered supporting element or means, whether the same be ground, dock, boat or other portable or stationary element. As the weight of the projecting portion of the rod or pole is always substantially greater than the portion between the engaging elements of my device, the handle or butt end of the pole is easily and quickly insertable and mountable in the manner before described. When the pole is desired to be removed the pole is merely withdrawn from the device.

My device holds the rod with complete safety against withdrawal in normal conditions of use, and maintains the rod or pole projected in the desired direction and angle and because the bar 27 is swivelly mounted as before described, the pole is permitted to be optionally maintained away from any substantial existing wind.

As many changes could be made in the above construction, and many apparently widely different embodiments of my invention within the scope of the claims constructed without departing from the spirit or scope thereof, it is intended that all matter contained in the accompanying specification shall be interpreted as illustrative and not in a limiting sense.

I claim:

1. A rod and pole holding device comprising a substantially U-shaped frame having a formed frame, a continuous bar and a forward downwardly bent yoke adapted to support an intermediate portion of a pole or rod and having its depending leg portions twisted spirally to form a pair of integral spiral springs intermediate the support-engaging portions and the U-shaped frame portion, and a cross bar mounted to connect the upper portions of said springs and providing an engaging and retaining member for the butt end portion of a pole.

2. A rod and pole holding device comprising a substantially U-shaped frame having a pair of depending legs and downwardly bent forward yoke adapted to support an intermediate portion of a pole or rod; a pair of springs intermediate and integral with said yoke and said legs, and a cross bar mounted to connect the inner portions of said springs and providing an engaging and retaining member for the butt end portion of the pole.

3. A pole holding device for rods and poles comprising a U-shaped frame formed of a continuous metal bar and having a pair of depending legs adapted to engage the ground or supporting surface; an upwardly bent yoke integral with the intermediate portion of said frame, the intermediate portions of said frame being formed into two spaced apart spiral springs, and an integral upwardly opening pole-engaging recess on the foremost end of the said frame, said legs being adapted to be mounted on a supporting surface at desired angles.

4. A rod and pole holding device comprising a substantially U-shaped frame having a pair of depending legs, said legs having horizontally extending extensions on each end thereof, said device having a downwardly bent forward yoke adapted to support an intermediate portion of a pole or rod; a pair of springs intermediate and integral with said yoke and said legs, and a cross bar mounted to connect the inner portions of said springs and providing an engaging and retaining member for the butt end portion of a pole.

5. A pole holding device for rods and poles comprising a U-shaped frame formed of a continuous metal bar and having a pair of depending legs, said legs having a horizontally extending extension on each thereof; an upwardly bent yoke integral with the inner portion of said frame, the intermediate portion of said frame being formed into two spaced apart spiral springs; an integral upwardly opening pole engaging recess on the foremost end of said frame; and an apertured transverse bar connecting the horizontally extending portions of said legs together, said cross bar being pivotally connectable to a supporting surface to provide the swivel rotation of said device.

6. A rod and pole holding device comprising a substantially U-shaped frame formed from a continuous bar and having a downwardly bent yoke adapted to support an intermediate portion of a pole or rod and having its depending leg portions twisted spirally to form a pair of integral spiral springs intermediate the support-engaging portions and the upper U-shaped frame portion, and having a cross bar mounted to connect the upper portions of said springs and providing an engaging and retaining member for the butt end portion of a pole, each of said depending legs having a horizontally extending extension; a transverse bar connecting said horizontally extending portions on said legs together, and a removable screw extending through the aperture of said transverse bar and normally engaging a supporting surface whereby said device is swivelly mounted with respect to said supporting surface.

THOMAS JOSEPH BROWN.

REFERENCES CITED

The following references are of record in the file of this patent:

UNITED STATES PATENTS

| Number | Name | Date |
|---|---|---|
| 2,139,826 | Huntly | Dec. 13, 1938 |
| 2,143,109 | Hadaway | Jan. 10, 1939 |
| 2,423,933 | Gosh | July 15, 1947 |